2,776,890

METHODS OF PROTECTING ENSILAGE

Eric Charles Kunz, Arden, N. C.

No Drawing. Application March 13, 1953,
Serial No. 342,270

5 Claims. (Cl. 99—8)

The present invention relates to the storing of ensilage and more particularly to a method of preserving ensilage against spoilage.

It is well recognized that ensilage, if protected from air, can be stored for long periods without deterioration, whereas if exposed to air, a deterioration occurs, due mostly to the presence and growth of aerobic micro-organisms producing molds which make the ensilage unfit as a feed. In warm climates spoilage occurs within a week on an unprotected surface of any type of silage or fodder and proceeds to a depth of several feet after a few months' storage.

Whereas it is not impossible to reduce the air spaces between the particles of green or semi-cured grass or other fresh leafy material in a silo by mechanical means, it is very difficult to do so on the surface of the silo or fodder. Many attempts have been made to reduce the exposed surface in a silo to a minimum, for example by the use of the familiar cylindrical silos, from 20 to 50 feet high. However, it has not been possible thus far, in a practical and inexpensive way to seal off the surface from the access of air and thus prevent surface spoilage of the fresh fodder or of the ensilage.

It is, therefore, the primary object of the present invention to present a practical and inexpensive method of preventing the access of air to the top layers of ensilage in a silo, or between charges of ensilage, to thereby prevent spoilage.

It is another object of the present invention to cover the surface of the ensilage with an airtight chemical cover produced at the very surface of the ensilage and forming a part of it.

It is a further object of the present invention to intermix with a mass of fresh fodder a material which will protect the fodder against air attack.

With reference to the preferred form of the invention the air impervious film which forms the chemical cover of the present invention is effected by first wetting the surface of the fresh fodder until thoroughly wetted down. The wet surface of the fodder is then completely covered with a suitable material such as a derivative of cellulose for example, carboxy-methyl-cellulose. These cellulosic derivatives can be applied in a powdered form by any conventional dispersing means such as an insecticide duster which is commonly found on a farm. The powder is applied as evenly as possible and after it settles on the wetted surface of the fodder a semi-liquid jelly-mass is formed. This gum-like cover will dry in a few days and form a semi-elastic cover excluding the air from the fodder.

Carboxy-methyl-cellulose is preferably used because of its commercial availability and low cost. Carboxy-methyl-cellulose is widely used in ice cream, as a gelatin, because of its ready availability and its low cost. Other alkyl compounds such as ethyl and propyl may be used, however, these are not as commercially available as carboxy-methyl-cellulose or at as low a price.

If the first application does not produce a film of sufficient thickness, or is uneven and broken, a second or third application can be made. Very often a silo is filled only partially with grass and/or other fresh fodder and the filling is continued after several weeks. In this case, spoilage of the fodder can be avoided by the application of a carboxy-methyl-cellulose film, which film does not have to be removed when the next filling operation is started.

An alternative method of producing this air impervious film can be effected by placing the carboxy-methyl-cellulose in solution and spraying or otherwise coating the surface of the fresh fodder.

Under the conditions of long spells of very hot, humid weather the carboxy-methyl-cellulose, although it is not subject to rapid deterioration, is nevertheless subject to fungus growth. Under such conditions a stabilizer can be added in a powdered form or in the form of an alcoholic or hydroalcoholic solution. When application is made of these well known preservatives of cellulosic materials, it can be of a phenolic or thiocarbamate nature.

Under circumstances where economic conditions permit, another alternative method of protecting ensilage against attack by air may be used wherein carboxy-methyl-cellulose may be blown in a dust form or sprayed in a liquid form onto the fresh fodder as the fodder is blown into the silo. In this manner the fodder in the whole silo may be coated. If desired, however, only the last three or four feet of fodder may be subjected to this intermixing of carboxy-methyl-cellulose, thereby producing a thick protective mass at the top of the silo. The carboxy-methyl-cellulose combines with moisture from the fodder in a like manner as before described to form a jelly-like mass which upon drying produces an air-impervious protective covering for the ensilage.

Though the invention has been described with the use of cellulose derivatives and particularly carboxy-methyl-cellulose, I do not wish to be limited to their use and any non-toxic compound which will form a viscous solution in a solvent, and which upon drying forms an air impervious and non-toxic film, can be used. Other changes which would occur to one skilled in the agricultural field are also contemplated.

Having thus described the invention, what is claimed as new and desired to be secured by Letters Patent is:

1. A method of preserving ensilage which comprises the steps of assembling a quantity of fresh fodder into a mass, applying to the exposed surfaces of said mass a water-soluble, non-toxic, film-forming derivative of cellulose in powdered form, providing moisture on said surfaces of said mass to combine with the powdered derivative and form a viscous coating in situ on said surfaces and drying the coating so formed, whereby said fresh fodder is protected from air both during and after its conversion to ensilage by fermentation processes.

2. The method of claim 1 wherein there is included with the powdered derivative of cellulose a stabilizer to preserve the derivative.

3. A method of preserving ensilage which comprises the steps of assembling a quantity of fresh fodder into a mass, the exposed surfaces of the fodder being in wet condition, and forming in situ on the surfaces of the mass that are exposed to air a continuous air-impervious film of a water-soluble, non-toxic film-forming derivative of cellulose by applying the said derivative to the surfaces in powdered form, the powdered derivative combining with the water to form a viscous coating, and drying the coating so formed, whereby said fresh fodder is protected from air both during and after its conversion to ensilage by fermentation processes, the steps of assembling the fodder and forming the film in situ being carried out while the fodder is at normal temperature.

4. The method of claim 3 wherein said water-soluble film-forming material is carboxy-alkyl cellulose.

5. The method of claim 4 wherein said material is carboxy-methyl cellulose.

References Cited in the file of this patent

UNITED STATES PATENTS

| | | |
|---|---|---|
| 1,551,427 | Pfister | Aug. 25, 1925 |
| 2,480,103 | Fux | Aug. 30, 1949 |
| 2,491,495 | Hart et al. | Dec. 20, 1949 |
| 2,558,042 | Cornwall | June 26, 1951 |

FOREIGN PATENTS

| | | |
|---|---|---|
| 468,940 | Great Britain | July 15, 1937 |

OTHER REFERENCES

Hollabaugh et al.: Ind. and Eng. Chem., October 1945, pages 943–947.